United States Patent [19]

Casinelli, deceased

[11] 4,398,593

[45] Aug. 16, 1983

[54] HEATER PLATE ASSEMBLY

[75] Inventor: Dominic L. Casinelli, deceased, late of Houston, Tex., by James E. Harrell, legal representative

[73] Assignee: James E. Harrell, Houston, Tex.

[21] Appl. No.: 323,192

[22] Filed: Nov. 20, 1981

Related U.S. Application Data

[63] Continuation of Ser. No. 187,604, Sep. 15, 1980, abandoned.

[51] Int. Cl.³ .......................... F28D 7/02; F24H 7/00; C09K 3/18
[52] U.S. Cl. ...................... 165/104.11; 165/DIG. 4; 126/400; 252/70
[58] Field of Search ............... 126/400, 375, 246, 430, 126/436, 92 R, 92 C, 86; 252/74, 71, 76, 70; 165/104.11 A, 104.15, DIG. 4

[56] References Cited

U.S. PATENT DOCUMENTS

| | | |
|---|---|---|
| 143,564 | 10/1873 | Fitch . |
| 777,104 | 12/1904 | Kahn . |
| 784,402 | 3/1905 | Hutzler . |
| 804,090 | 11/1905 | Boeck . |
| 920,719 | 5/1909 | Blasberg . |
| 966,579 | 8/1910 | Myers . |
| 1,034,268 | 7/1912 | McCord . |
| 1,049,385 | 1/1913 | Mohrenwitz . |
| 1,370,722 | 3/1921 | Adam . |
| 1,412,717 | 4/1922 | Stowell ............................. 126/400 |
| 2,936,741 | 5/1960 | Telkes ................................ 252/71 |
| 3,372,179 | 5/1967 | Goodell ........................... 126/92 C |

FOREIGN PATENT DOCUMENTS 1240877  7/1971  United Kingdom ................ 252/71

*Primary Examiner*—Samuel Scott
*Assistant Examiner*—G. Anderson
*Attorney, Agent, or Firm*—Vaden, Eickenroht, Thompson, Bednar & Jamison

[57] ABSTRACT

A heater plate assembly for heating with heat retained from an external heat source including a plate housing adapted to be heated by the external heat source, the plate housing having an internal cavity, and heat retaining means including glass beads disposed in the internal cavity of the plate housing for retaining heat from the external source for subsequent retained heating of the plate housing.

3 Claims, 3 Drawing Figures

U.S. Patent    Aug. 16, 1983    4,398,593
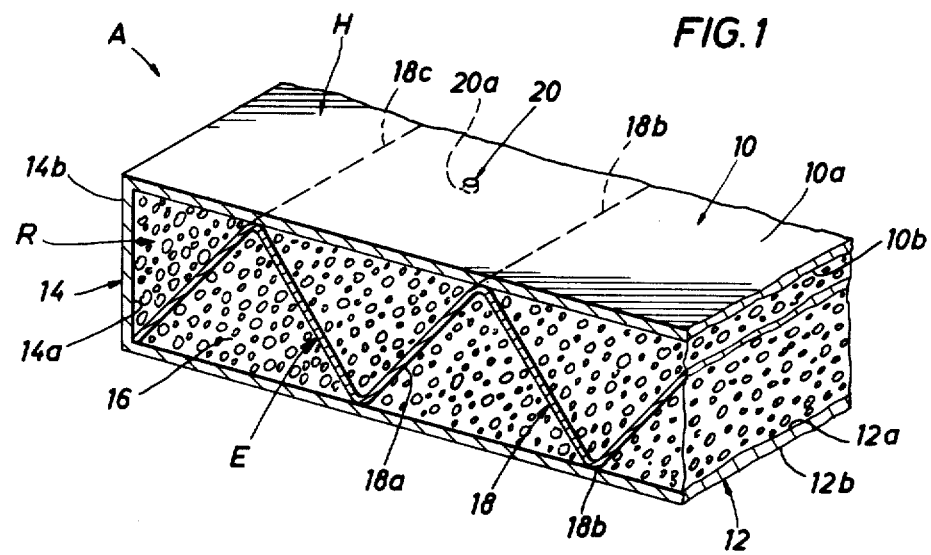
FIG. 1
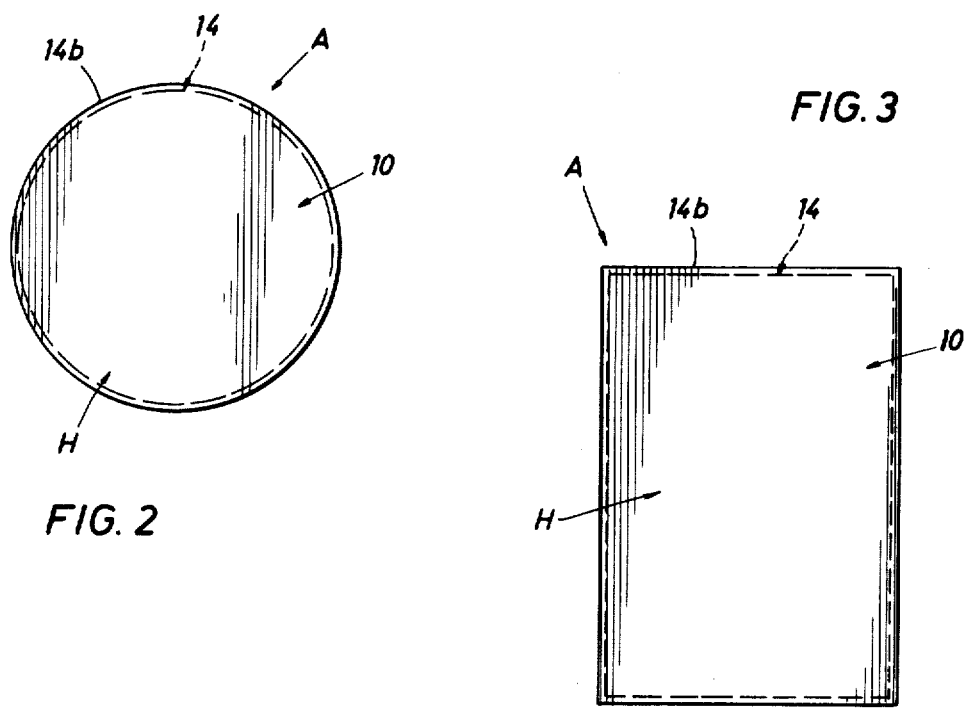
FIG. 2
FIG. 3

HEATER PLATE ASSEMBLY

This is a continuation of application, Ser. No. 187,604, filed Sept. 15, 1980, now abandoned.

TECHNICAL FIELD

The field of this invention relates to heating devices, particularly of the type capable of being heated and retaining such heat, and thereafter using such retained heat for a variety of purposes such as cooking and the like.

PRIOR ART

Many types of devices have been known that are capable of retaining heat from a heat source and thereafter using the retained heat for cooking and other heating-type purposes. For example, in U.S. Pat. No. 143,564, a plurality of metal blocks capable of absorbing heat are used for retaining heat as does U.S. Pat. No. 1,049,385 which similarly uses a heated metal disk for providing warming for tableware; U.S. Pat. No. 804,090 discloses a metal shell containing a heat-retaining filling of hardened or solidified plastic capable of being used as a warming agent for various kinds of auxiliary heaters; U.S. Pat. No. 1,370,722 discloses the utilization of a sand core for heat retention in a heating device for fireless cookers. Other types and configurations of fireless cookers which permit the accumulation of heat for cooking and other purposes are generally shown in U.S. Pat. Nos. 784,402; 920,719; 966,579; and 1,034,268.

In U.S. Pat. No. 777,104, an apparatus for cooking by retained heat is disclosed utilizing a corrugated vertically disposed partition for an insulator rather than for retaining heat; while U.S. Pat. No. 1,412,717 discloses the utilization of an aluminum jacket having ribs that protrude into the interior of a cavity filled with a substance which changes from a solid to a liquid at a temperature proper for cooking, for retained heating for cooking.

However, so far as known, no light-weight, compact device is known capable of retaining high quantities of heat over extended periods of time.

SUMMARY OF THE INVENTION

The present invention relates to a new and improved heater plate assembly for heating with heat retained from an external heat source including a plate housing having an internal cavity for receiving heat retaining means therein for retaining heat from the external source for subsequent retained heating of the plate housing, with the heat retaining means including glass beads.

DESCRIPTION OF THE DRAWINGS

FIG. 1 shows an isometric, sectional view of the heater plate assembly of the present invention;

FIG. 2 shows a plan view of one configuration of the heater plate assembly of the present invention; and, FIG. 3 shows a plan view of an alternative configuration for the heater plate assembly of the present invention.

DESCRIPTION OF THE PREFERRED EMBODIMENT

The present invention relates to a new and improved heater plate assembly designated generally in the drawings by the letter A. The heater plate assembly A includes generally a plate housing H and heat retaining means R for retaining heat from an external source of subsequent retained heating of the plate housing H.

The plate housing H of the heater plate assembly A of the present invention includes an upper plate 10, lower plate 12, and side portion 14. The upper plate 10 includes an upper surface 10a and a lower surface 10b while similarly, the lower plate 12 includes an upper surface 12a and a lower surface 12b. Preferably, the upper plate 10 and lower plate 12 of the plate housing H are of the same configuration. Accordingly, the heater plate assembly A may be of a circular configuration as shown in FIG. 2, a generally rectangular configuration as shown in FIG. 3, or any other suitable configuration (not shown) that accomplishes the purposes set forth hereinbelow. The upper plate 10 and lower plate 12 are joined together adjacent the perimeter thereof by an appropriate side portion 14 which has an inner surface 14a and an outer surface 14b. The side portion 14 may be joined with the upper plate 10 and lower plate 12 by crimping, braising, welding, glueing, or any other suitable method capable of joining the plates 10, 12 and side portion 14 together and withstand the heat and temperatures encountered by the heater plate assembly A of the present invention. As such, the lower surface 10b of upper plate 10 and upper surface 12a of lower plate 12 and inner surface 14a of side portion 14 define an internal cavity designated generally as 16 within the plate housing H of the present invention.

The heater plate assembly A of the present invention further includes heat retaining means R which is adapted to be disposed within the internal cavity 16 of the plate housing H for retaining heat, as discussed more fully hereinbelow. The heat retaining means R preferably include glass beads for heat retention within the plate housing H. The glass beads may include soda-lime beads, such as those manufactured by the Cataphote Division of Ferro Corporation of Jackson, Miss. Heretofore, such soda-lime beads have been used in liquid or air blasting cabinets and used in equipment for cleaning, or peening, or as a finishing agent. Other uses for such beads include utilization in paints, to add a light reflecting quality to such paints, as used in highway paints and the like, as well as abrasives used in concrete for road surfaces and the like.

Thypically, the glass beads are manufactured from a high-grade glass, generally designed for blasting. The composition is of a type designed to resist wear and fracture upon impact and the beads are annealed in their spherical shape to equalize internal stresses and resist fracture. Typically, such soda-lime beads contain not more than fifteen percent irregularly shaped particles and are reasonably free of sharp angular particles, the quantity of which does not exceed one percent; glass particles showing milkiness or surface scoring or scratching, generally do not exceed two percent, and such glass beads typically contain some foreign matter which does not exceed one-half of one percent (including iron particles, the quantity of which does not exceed one-tenth of one percent). Furthermore, such glass soda-lime beads are available in many different sizes, ranging from 0.0005 inches to 0.0276 inches (10–710 microns). Such beads have typically a density of less than 2.99 and do not show a tendency toward decomposition, including surface etching, when exposed to atmospheric conditions, moisture, dilute acids or alkalies. Such beads are crystalline in color and free from all surface films.

These glass soda-lime beads have proven to be superior to any other known heat absorption material. For example, as shown in the prior art, silica sands have been extensively used. These sands were tested and compared with the glass soda-lime beads of the present invention for performance. Upon testing, the glass beads were found to be superior to silica sand because the glass beads were free from surface films and relatively free from foreign matter, whereas silica sands were found to have surface films and foreign matter as high as four percent of the total weight. Furthermore, because of such high quantities of surface films and foreign matter in such silica sands, upon heating, these silica sands release offensive odors while not being capable of retaining heat as well as the heat retained by the glass soda-lime beads of the heat retaining means R of the present invention.

Furthermore, the heat retaining means R of the present invention may include a binder, phenanthrene, for binding the glass soda-lime beads together for enhanced heat retention. The phenanthrene, as manufactured by Henley and Co., Inc., typically has a molecular weight of 178.2 and is of the chemical formulation $C_{14}H_{10}$. Phenanthrene is typically soluble in cold ether, benzene, carbon disulfide, glacial acetic acid, and toluene. In the past, phenanthrene has been used as a starting material in the production of phenanthrene quinone, diphenic acid, resins, dyestuffs, insecticides, and pharmaceuticals. Solid chlorinated derivatives of phenanthrene can be used as non-flammable electrical insulating and impregnating agents. Further, phenanthrene can be used as a softener for polystyrenes, or as an additive to precipitation baths for plastics. So far as known, phenanthrene has never been used as a binder for any type of heat retention device. As far as general appearance, phenanthrene appears in a somewhat "wax shaving" form or a flake and is preferably mixed with the glass soda-lime, beads with the phenanthrene acting as a binder to join the glass soda-lime beads together. Furthermore, the phenanthrene acts as a type of blocking agent to insulate the glass soda-lime beads for either hot or cold to enhance the heat retaining capability of the glass beads. Thus, the phenanthrene tends to lock in the heat within the glass soda-lime beads, once the beads are heated, to enhance the length of heat retention.

In the preferred form, the heat retaining means R is formed of substantially twenty parts by weight of phenanthrene to eighty parts of glass soda-lime beads, by weight. When the heater plate assembly A of the present invention is heated, the phenanthrene flakes melt and tend to fuse about the glass soda-lime beads. Ultimately, upon cooling thereof, the binder resolidifies with the soda-lime beads bound together therein. Thus, by utilization of the combination of phenanthrene and glass soda-lime beads, an effective heat retaining means R is utilized with the heater plate assembly A of the present invention for enhanced heat retention, that heretofore has not been known. Thus, it is preferred that the heat retaining means R of the present invention include substantially eighty percent by weight glass soda-lime beads and substantially twenty percent by weight of phenanthrene for enhanced heat retaining capabilities; however, other percentage combinations may be used without departing from the spirit of this invention, and in particular, the glass beads alone may form the heat retaining means R of the present invention.

The heater plate assembly A of the present invention further includes a heat transfer enhancement means E disposed in the internal cavity 16 for enhancement of the heat transfer to and from the heat retaining means R. The transfer enhancement means E includes a heat conductive member 18 that is adapted to contact the lower surface 10b of upper plate 10 and upper surface 12a of lower plate 12 as well as the heat retaining means R within the internal cavity 16. Preferably, the heat conductive member 18 includes corrugated plate 18a which is disposed within the internal cavity 16 in engagement with the upper surface 12a of the lower plate 12 along contact line 18b which enhances heat transfer between the lower plate 12 into the heat retaining means R and in engagement with the lower surface 10b of upper plate 10 along contact line 18c which enhances heat transfer between the heat retaining means R to the upper plate 10.

Preferably, the heat conductive member 18, as well as the upper plate 10, lower plate 12, and side portion 14 of the plate housing H are of a high purity aluminum. The high purity aluminum enhances heat transfer to and from the heater plate assembly A. The high purity aluminum is lightweight in design, yet not as susceptible to failure because of melting and the like upon the heater plate assembly A encountering high temperatures as aluminum alloys. Aluminum alloys, on the other hand, tend to fail because of melting and the like when placed into a high heat temperature environment, and consequently, it is preferred that a high quality aluminum be used.

Furthermore, the heater plate assembly A of the present invention includes vent means designated generally as 20 with the plate housing H to permit venting of any unwanted gas pressures within the internal cavity 16 during use of the heater plate assembly A. The vent means 20 may include a suitable opening such as 20a which may be formed in either the upper plate 10, lower plate 12, and/or side portion 14 to allow the escape of any such gases. The opening 20a preferably is in communication with the internal cavity 16 and allows gases to flow therefrom to the outside surrounding environment of the heater plate assembly A.

Thus, the heater plate assembly A of the present invention is adapted to be heated by an external source (not shown) such as a suitable stove burner, oven, or any source of heat through the upper plate 10, lower plate 12, side portion 14, or any combination thereof, for the retention of heat, and thereafter used to heat other devices and/or utensils. The lower plate 12, by way of example, may be heated by a gas burner or electrical element of a stove (not shown) which results in flow of heat from and through the burner or element, to the lower plate 12, through the lower plate 12 and heat conductive member 18 thereinto the heat retaining means R for appropriate heating thereof. Any gases generated during the heating thereof are allowed to vent from within the internal cavity 16 by means of vent means 20. After the heater plate assembly A has been appropriately heated, the heater plate assembly A may thereafter be removed and used to heat another device or utensil, such as, by way of example, a cooking utensil (i.e. pots and pans). Such a cooking utensil may, by way of example, thereafter be placed upon the upper plate 10 of the plate housing H for appropriate heating thereof. Further, by way of example, another utilization of the heater plate assembly A of the present invention may be used to diffuse a localized heat source to provide more uniform heating over a larger area to prevent potential burning and/or scalding of contents within such a localized heated cooking utensil. For example, it is not unusual for a gas flame to have a "hot spot" to cause localized heating of the cooking utensils. By placing the heater plate assembly A of the present invention between the gas flame and the lower surface of the cooking utensil, the heat from the flame is absorbed by the heater plate assembly A, and conducted therethrough into the cooking utensil, however eliminating the "hot spot" deficiency because of the even distribution of heat that is accomplished by means of the heat transfer enhancement means E and heat retaining means R of the present invention.

It will be appreciated that any configuration heater plate assembly A may be used to effectuate any desired heating purpose. Thus, the heater plate assembly A of the present invention provides a new and improved device for being heated, retaining heat, and thereafter subsequently using the retained heat for heating of the utensils, devices, and/or environments, in a uniform, evenly distributed fashion.

The foregoing disclosure and description of the invention are illustrative and explanatory thereof, and various changes in the size, shape and materials, as well as in the details of the illustrated construction and compositions may be made without departing from the spirit of the invention.

I claim:

1. A heater plate assembly for heating with heat retained from an external heat source, comprising:
   a plate housing formed having an internal cavity, said plate housing adapted to be heated by external heat source;
   said plate housing including an upper planar plate and a lower planar plate, said upper and lower plates separated by said internal cavity and enclosed by sidewall plates;
   said upper, lower and sidewall plates formed of impervious metal and secured into a fluid tight enclosure surrounding said internal cavity;
   heat retaining means disposed in said internal cavity of said plate housing for retaining heat from the external source for subsequent retained heating of said plate housing, said heat retaining means including glass beads packed within said internal cavity except for the open spaces between adjacent glass beads in contact with one another;
   said heat retaining means including phenanthrene for binding said glass beads together for enhanced heat retention, and said phenanthrene substantially filling the open spaces between said glass beads;
   heat transfer enhancement means disposed in said internal cavity for enhancement of heat transfer to and from said heat retaining means;
   said heat transfer enhancement means including a heat conductive member in contact with said upper plate, said lower plate and said heat retaining means within said internal cavity;
   said heat conductive member including a corrugated metal plate disposed within said internal cavity in engagement with said upper plate and lower plate of said plate housing; and
   vent means in communication with said internal cavity and with said plate housing to permit venting of any gas pressure within said internal cavity during heating of said plate housing.

2. The heater plate assembly of claim 1, wherein:
   said plate housing and said heat conductive member are formed of a high purity aluminum.

3. The heater plate assembly of claim 1, wherein:
   said heat retaining means includes substantially twenty percent by weight of said phenanthrene and substantially eighty percent by weight of said glass beads.

* * * * *